Dec. 23, 1924.  1,520,109
J. W. BISHOP ET AL
BOWLING PIN
Filed June 5, 1922
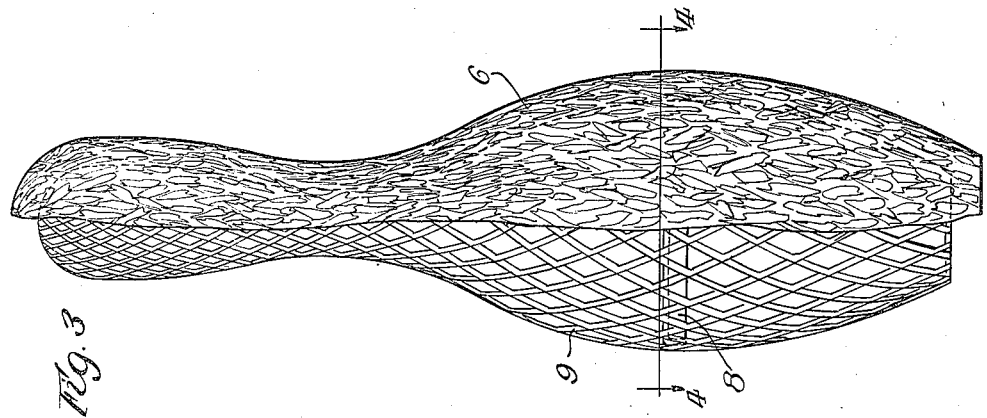
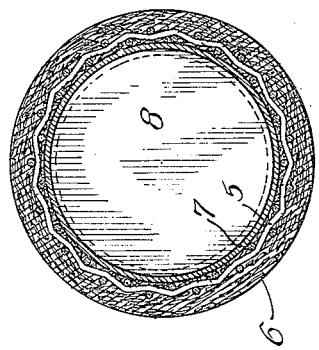
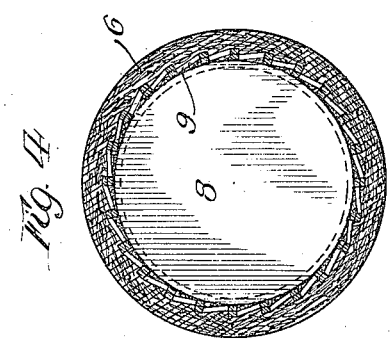
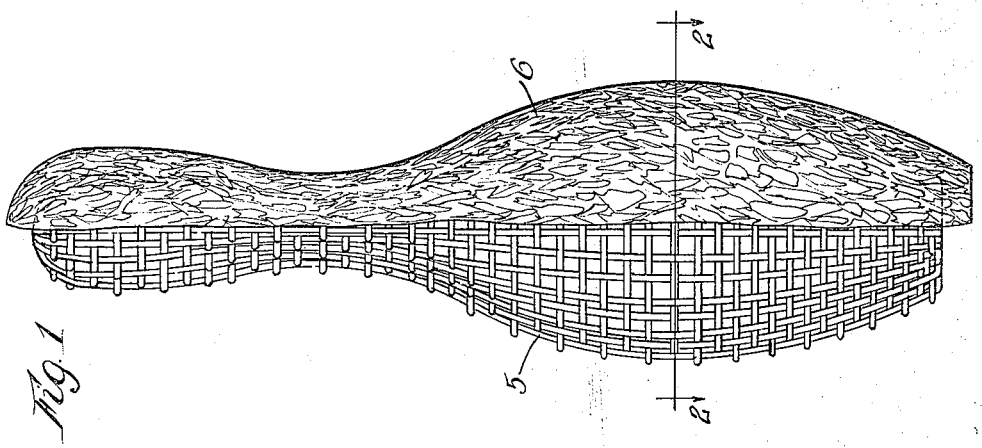

Patented Dec. 23, 1924.

1,520,109

UNITED STATES PATENT OFFICE.

JOSEPH W. BISHOP AND JESSE O. MATTESON, OF MUSKEGON, MICHIGAN, ASSIGNORS TO THE BRUNSWICK-BALKE-COLLENDER COMPANY, OF CHICAGO, ILLINOIS, A CORPORATION OF DELAWARE.

BOWLING PIN.

Application filed June 5, 1922. Serial No. 565,968.

*To all whom it may concern:*

Be it known that we, JOSEPH W. BISHOP and JESSE O. MATTESON, citizens of the United States, residing at Muskegon, in the county of Muskegon and State of Michigan, have invented certain new and useful Improvements in Bowling Pins, of which the following is a specification.

This invention relates to composition bowling pins and its object is to provide a substantial and durable pin and to reinforce and strengthen the composition covering.

In the accompanying drawings illustrating a selected embodiment of the invention Fig. 1 is an elevation showing the composition partly removed from the reinforce;

Fig. 2 is a transverse sectional view taken through a pin at the place indicated by the line 2—2 of Fig. 1 and showing the reinforced covering enclosing a hollow metal core provided with a transverse brace;

Fig. 3 is a view similar to Fig. 1 showing a reinforce made of expanded metal;

Fig. 4 is a transverse sectional view on the line 4—4 of Fig. 3 and also showing a transverse brace.

Referring to the drawings the reinforce 5 in Figs. 1 and 2 is made of reticulated fabric like wire mesh which is formed into the general shape of a pin and is embedded in the covering 6 made of some suitable composition molded or otherwise formed thereon in the shape of a bowling pin. We have found it satisfactory to employ a composition consisting of a hard rubber compound having small pieces of wood in the form of little sticks or splinters thoroughly incorporated therewith, as shown in the drawings, which is vulcanized on the reinforce.

This reinforce may be used alone as the frame work upon which the covering is molded or it may be used on a hollow metal core 7 which may be provided with a transverse brace 8 located about midway between the top and the bottom of the pin.

The reinforce when used alone or upon a core may be made of expanded metal 9 as shown in Figs. 3 and 4 or any other kind of reticulated metal suitable for the purpose may be employed.

The invention provides a substantial and durable pin in which the composition covering is strengthened and reinforced by the embedment of the reinforce therein, and if the core and brace are used the pin is very materially strengthened and reinforced thereby. The reinforce 5 or 9 may be made in sections united or assembled in any suitable manner or it may be made out of single sheets properly shaped or it may be made in any other suitable manner and of any suitable reticulated material.

In the vulcanizing operation the covering becomes united with the reinforce and also with the core where it engages therewith when the core is provided and it enables the production of pins of uniform standard size, shape and weight which can be varied as desired. We may use the brace in the reinforce without the core, as shown in Fig. 4 or we may use the core alone or with the brace as shown in Fig. 2.

We prefer to have the reinforce extending throughout the pin but this may not always be necessary and we reserve the right to locate the reinforce in portions only of the covering and to make all other changes which fairly fall within the scope of the following claims.

We claim:

1. A bowling pin having a reticulated metal reinforce, and a composition covering embedding said reinforce.

2. A bowling pin having a reticulated metal reinforce extending throughout its length, and a composition covering embedding said reinforce.

3. A bowling pin having a wire mesh reinforce, and a composition covering embedding said reinforce.

4. A bowling pin having a core, a reticulated metal reinforce on said core, and a composition covering enclosing said reinforce and core and embedding said reinforce.

5. A bowling pin having a hollow metal core, a reticulated metal reinforce on said core, and a composition covering enclosing said reinforce and core and embedding said reinforce.

6. A bowling pin having a reticulated metal reinforce, a transverse brace, and a composition covering embedding said reinforce.

7. A bowling pin having a hollow metal core, a transverse brace in said core, a reticulated metal reinforce on said core, and a composition covering enclosing said reinforce and core and embedding said reinforce.

JOSEPH W. BISHOP.
JESSE O. MATTESON.